United States Patent Office 3,229,087
Patented Jan. 11, 1966

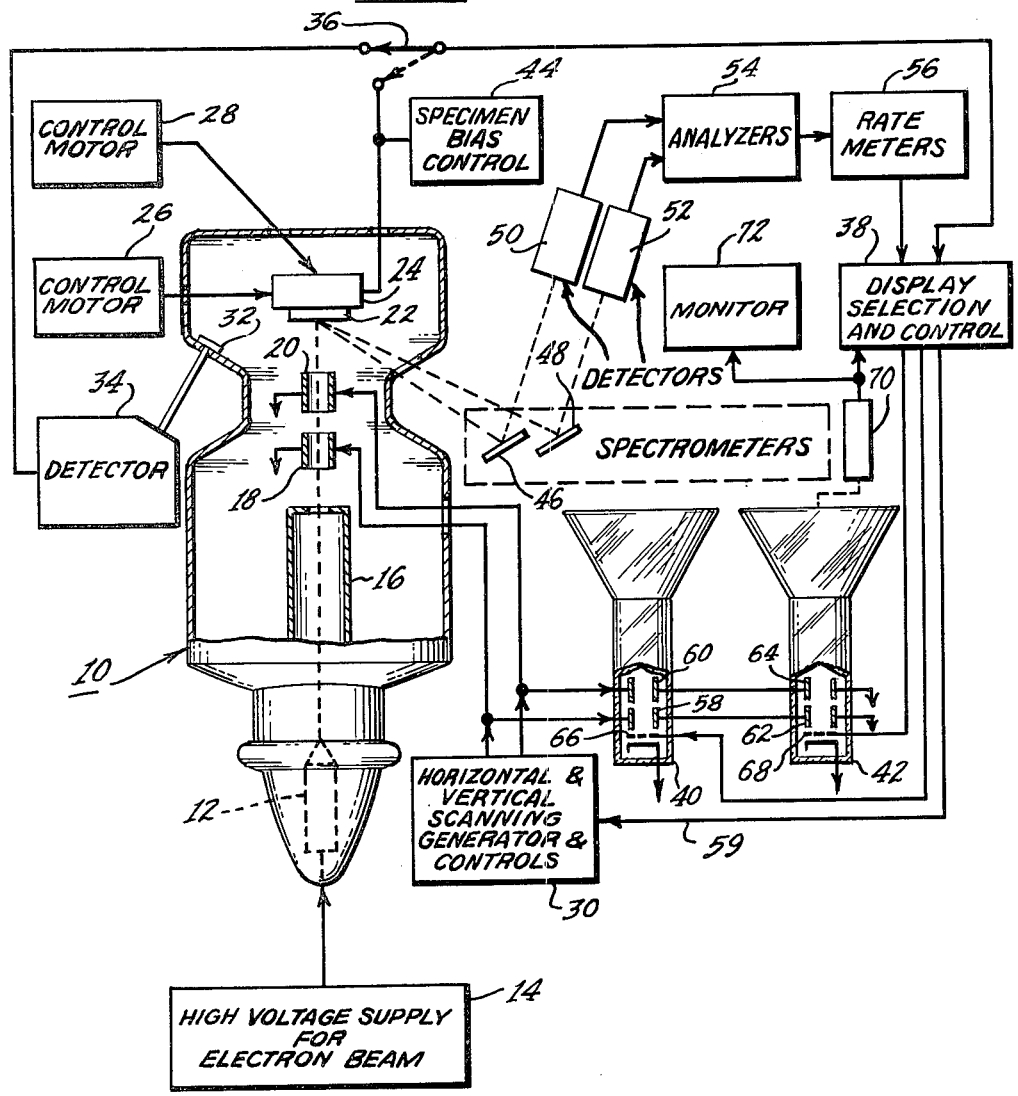

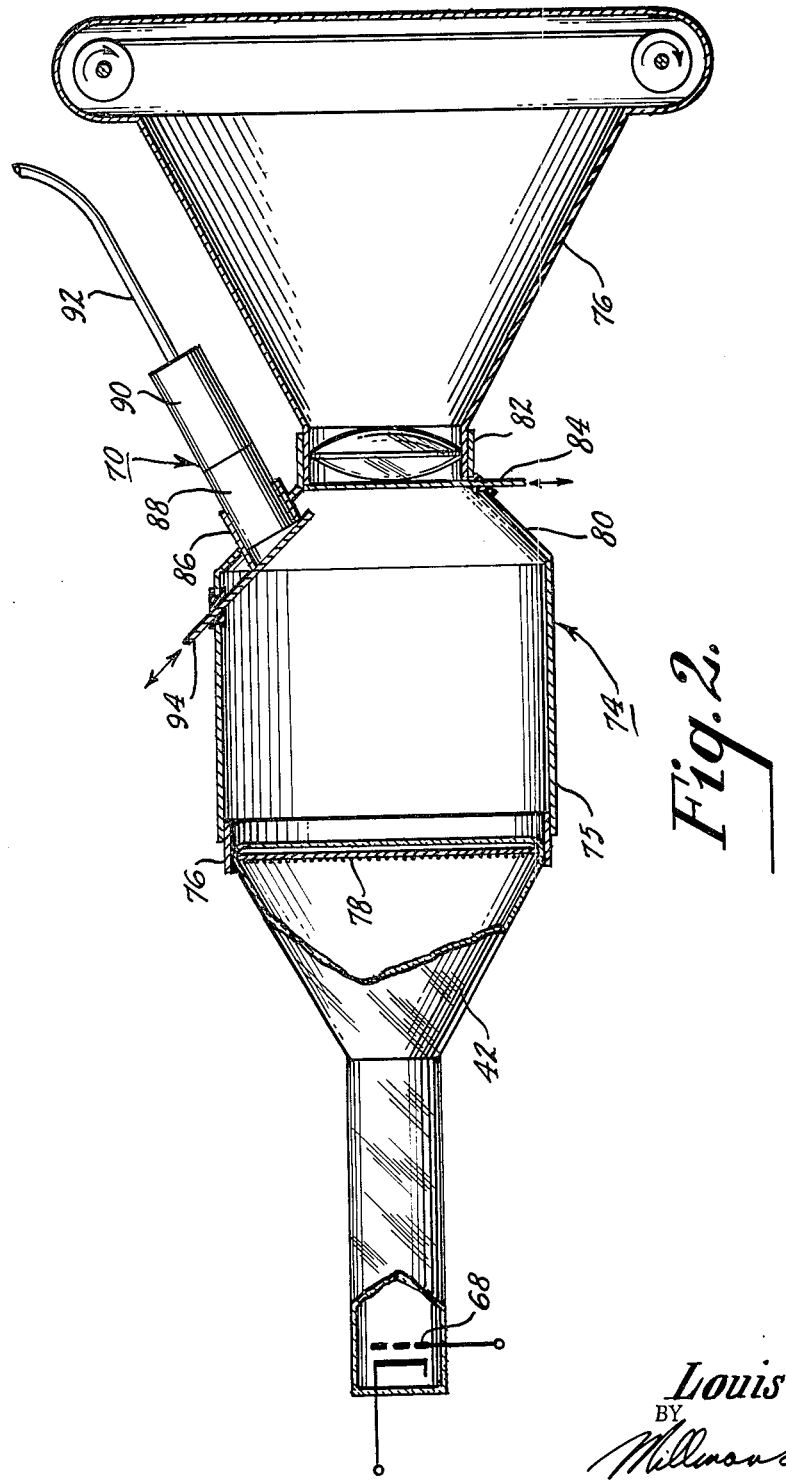

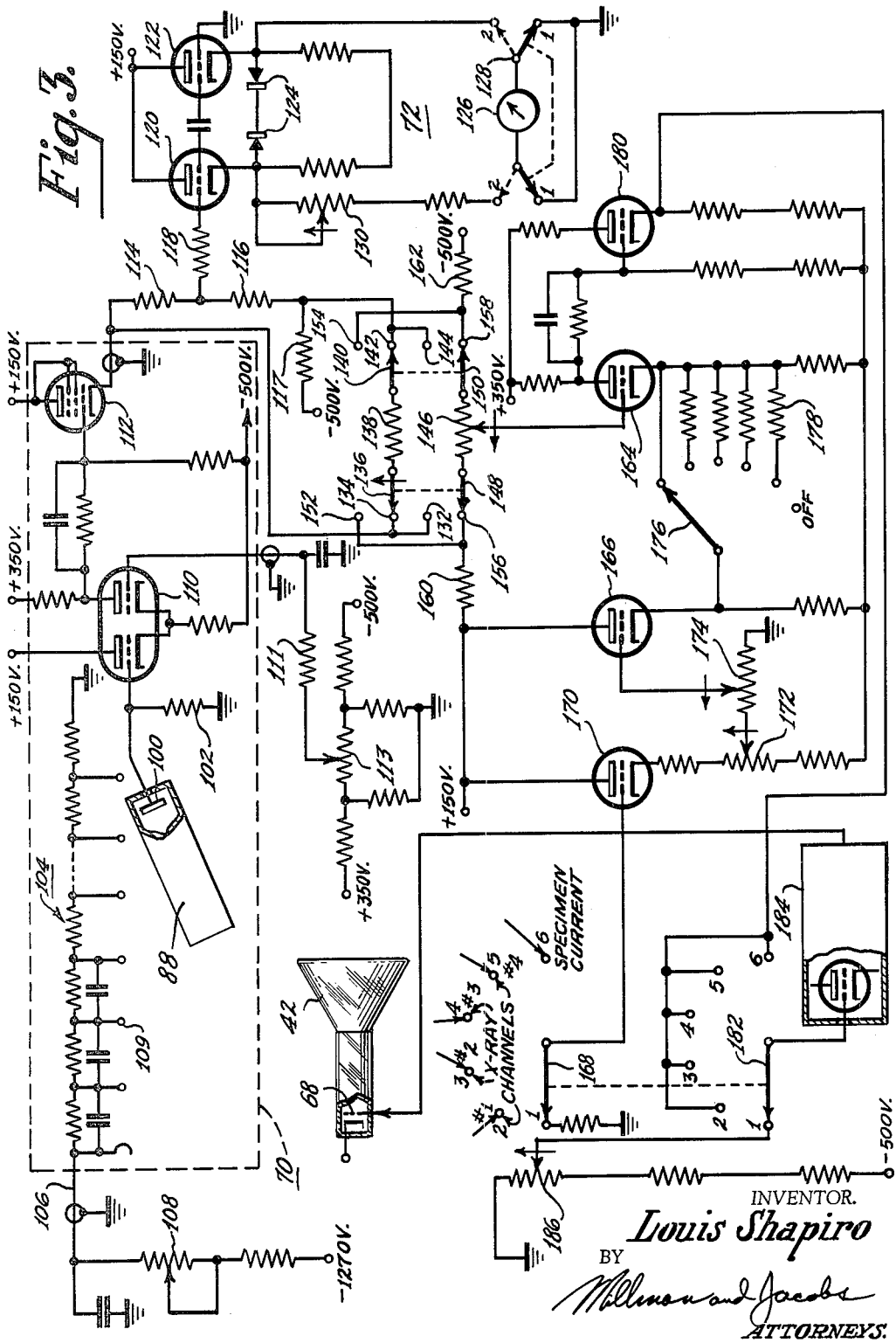

3,229,087
ELECTRON MICROANALYZER AND
MONITORING SYSTEM
Louis Shapiro, Erlton, N.J., assignor, by mesne assignments, to First Pennsylvania Banking and Trust Company, trustee
Filed Sept. 25, 1961, Ser. No. 140,493
15 Claims. (Cl. 250—49.5)

This invention relates to an electron microanalyzer system having an image display and to a system for monitoring the image display.

In the copending patent application, "Electron Probe System," Ser. No. 92,889, filed March 2, 1961, an electron microanalyzer system is described having a cathode ray tube image display. In this system, when photographic records of the displayed image are made, it is desirable to measure the light level of the cathode ray tube in order to obtain the proper exposure ranges for a given photographic film speed and the aperture setting of the camera. In photographing a picture in the aforementioned system, a considerable period of exposure time may be involved. In some instances, this exposure time period may be hours or even days for a complete scan of the specimen. Accordingly, it is desirable to provide a monitoring system in order to check the excursions of the light level of the cathode ray tube to insure proper operation, and to be able to hold the light level adjustment of the cathode ray tube at uniform levels over the long operating period.

It is among the objects of this invention to provide a new and improved light monitoring system for an image display device of an electron microanalyzer.

Another object is to provide a new and improved electron microanalyzer system having a reliable display system.

Another object is to provide a new and improved photographic recording and light monitoring system for a cathode ray tube.

In accordance with one embodiment of this invention, in a microanalyzer system, a beam of charged particles is directed to a specimen and deflected in a pattern over a surface of this specimen to derive electrical signals characteristic of emissions from that specimen. An image display device, a cathode ray tube, has a light spot display related to the specimen signals, and the light spot is moved in a pattern synchronously with the deflection of the electron beam to provide an image of the specimen characteristics. A light monitoring system derives electrical signals characteristic of the light spot intensity. In a feedback loop these light intensity signals are compared with the specimen signals for controlling precisely the intensity of the light spot to provide the image display. This feedback loop comparison system is effective to control reliably the light spot intensity over long periods of operation.

The light signals are also supplied to a meter circuit which is used for monitoring the light spot intensity during recording and also to provide appropriate settings of the light spot intensity range to set up the equipment for photographic recording.

A mount for a camera and a phototube monitor is provided which tightly fits over the cathode ray tube at the face thereof. The phototube monitor and camera are located in adjacent positions for monitoring of the light spot intensity in reliable relation to the actual recording light intensity.

The foregoing and other objects of this invention, the features thereof, as well as the invention itself, may be more fully understood from the following description when read together with the accompanying drawing, in which:

FIG. 1 is a schematic block diagram of a microanalyzer and display system embodying this invention;

FIG. 2 is a plan view partly in section of a mount embodying this invention for a camera and phototube monitor to be used with a cathode ray tube; and FIG. 3 is a schematic circuit diagram of a monitor circuit for use in the system of FIG. 1 and embodying this invention.

In the drawing, corresponding parts are referenced by similar numerals throughout.

In FIG. 1 a generalized block diagram of the scanning system of this invention is shown. The electron probe is formed as an electron beam in a column 10 that is oriented vertically. The beam is emitted from a filament 12 which is energized by a suitable adjustable high voltage supply 14 adapted to supply a maximum of about 50 kilovolts. The electron beam is formed by suitable electron optics 16. The electron beam passes through two sets of deflection plates 18 and 20 which respectively deflect the beam in transverse directions. The beam is directed to a specimen 22 supported on a specimen stage 24 which is adapted to be moved in transverse directions by separate control motors 26 and 28. The stage 24 is also adapted to be moved axially along the column 10 by another control motor (not shown).

The deflection plates 18 and 20 are separately energized by horizontal and vertical scanning generators shown generally by the block 30. The scanning raster may be of the order of two millimeters square, and the specimen may be many times that in area. The control motors 26 and 28 move the specimen 22 to different positions so that different areas of that specimen may be scanned by the electron beam.

High velocity electrons reflected from the specimen 22 are directed to a phosphor element 32 at the side of the column, and the light emitted from the phosphor is directed to a detector 34 which may be a photo multiplier. The electrical signal derived as an output from the detector 34 is characteristic of an electron image of the specimen 22, and this output is supplied via a switch 36 and a control system 38 to one or the other of two display tubes 40 and 42. A voltage bias is applied to the specimen 22 by a bias control 44, and the specimen current is used by itself or with the reflected electron signal via switch 36 to derive characteristic signals that may be selectively displayed via the control 38 on the display tubes 40 and 42.

Some of the electrons irradiating the specimen 22 penetrate that specimen and excite the emission of X-rays. These X-rays are directed to spectrometer crystals 46 and 48 and reflected to separate detectors 50 and 52, such as scintillation or Geiger-Muller counters. The outputs of the detectors 50 and 52 may be in the form of pulses and are supplied to scalers or analyzers 54 (such as pulse height analyzers), the outputs of which are transmitted via rate meters 56 to the control 38 for selecting the display on the tubes 40 and 42. Suitable arrangements for deriving appropriate electrical signals from the X-ray emission are well-known. Pen recorders (not shown) may be provided for charting these signals in addition to using them in the image display of tubes 40 and 42.

The display tubes 40 and 42 have deflection systems 58, 60, and 62, 64 respectively, which in the mode of operation herein discussed may be deflected in synchronism with each other and with the deflection plates 18 and 20 of the column 10 by the scanning generators 30. The terms "horizontal" and "vertical" are used to refer conveniently to the usual orientations of the scanning in a display tube; but no restriction as to actual positions of use is intended thereby.

In operation, electron images of the specimen being scanned are provided by the reflected electron currents and by the specimen currents, one of which may be selected for imaging on a display tube 40 or 42, or one or both of which may be used to derive signals representative of the atomic number of the specimen. In addition, an X-ray image of the specimen is represented by signals derived from the spectrometer of crystals 46 and 48 and the detectors 50 and 52. These various image signals may be selected via the control 38 and displayed by intensity modulation of the display tubes 40 and 42 via their grids 66 and 68. For example, one of the tubes may display an electron image and the other, an X-ray image, or different kinds of X-ray images may be displayed by the two tubes 40 and 42. Various other arrangements for displaying information about the specimen 22 are set forth in the aforementioned copending application. For example, the signals to be displayed may be applied via a connection 59 to the scanning generator control 30 for deflection of the display tube beam. Thereby, deflection of its beam is proportional to the signals applied so that one or the other of the display tubes 40, 42 may be used to indicate such measurements of the characteristics of the specimen 22 as well as the images thereof.

A light monitoring system for the tube 42 includes a photometer head 70 positioned adjacent the face of the tube 42. The electrical output of photometer 70 is supplied to the display and selection control 38. Included in this control 38 is means for controlling the light intensity of the tube 42. The output of the photometer head 70 is also supplied to a monitor circuit 72 which includes a meter circuit.

Shown in FIG. 2 is a mount 74 for the camera 76 and photometer head 70 for use with the cathode ray tube 42. The mount 74 includes a generally cylindrical tubular section 75 made of a stiff material such as aluminum which fits over the bezel ring 76 of the cathode ray tube 42 adjacent the phosphor screen 78. The cylindrical tube 75 fits tightly over the ring 76, and felt pads or the like may be inserted therebetween to ensure a light tight connection. At the other end of the tube 75, an integral conical section 80 connects the tubular section 75 to another cylindrical section 82. The latter section 82 fits tightly over the cylindrical front end of the camera 76 in which the lens and aperture adjustments are provided. The inside surfaces of the sections 75 and 80 are non-reflecting and may be provided with a mat finish or any suitable optical block coating for this purpose.

A simple slidable shutter 84 of circular shape is manually slidable through a slot formed around the inside of the ring portion 82 and through one side thereof to provide a light tight cover for the camera. When the recording operation is to be performed, the operator slides the shutter 84 out sufficiently removed to open the camera completely to the light image from the phosphor screen 78. A tube 86 is formed in the mount 74 projecting on either side of and through the conical surface 80 thereof adjacent the camera lens. Tightly fitted within this projecting tube 86 is the photometer head 70 that includes a phototube 88 and related circuitry 90, all mounted in a cylindrical casing. A cable 92 connects an appropriate power supply for the photometer head 70 and transmits the derived electrical signals to the monitoring circuitry 72. Another slidable shutter 94 slides through the wall 75 to removably cover the inside of tube 86 and provide a light closure for photometer head 70.

With the shutter 94 removed from the tube 86, the phototube 88 is exposed to the light spot on the face of the phosphor screen 78 and monitors that light spot intensity in a manner consistently related to the light intensity directed into the camera 76 for recording. When the shutter for the camera 76 is closed, the photometer 70 and meter circuit 72 may be used for adjusting the setting of the light output of the cathode ray tube 42 for the appropriate film speeds and aperture settings of the camera 76. During recording, both shutters 84 and 94 are opened so that continuous monitoring of the light spot intensity during the recording process takes place.

In FIG. 3 a circuit diagram is shown of the photometer head 70, the monitor metering circuit 72, and associated portions of the control and selection circuits for the display tube 42. The anode 100 of the photomultiplier 88 is connected through a load resistor 102 to ground potential. A voltage divider network 104 serves to establish proper operating potentials for the various dynodes (not shown) of the photomultiplier 88. This voltage divider 104 is connected between ground and about −1270 volts supplied by a high voltage cable 106 from a negative high voltage source adjusted through a sensitivity control resistor 108 (which can be adjusted by an operator at the control panel of the system). The various taps 109 of the network 104 are connected to the dynodes of the photomultiplier.

The photomultiplier anode 100 is also connected to one input of a difference amplifier 110. The other input to difference amplifier 110 is via a cable connection through resistor 111 to an adjustable potentiometer network 113. The output of amplifier 110 is taken at the anode of the other tube of that amplifier 110. This output is connected through a resistor-capacitor coupling to the grid of a pentode 112, which is connected as a cathode follower through a voltage divider network 114, 116, 117. The junction of the resistors 114 and 116 is connected through a resistor 118 to the grid of a cathode follower 120. The grid of a second cathode follower 122 is returned to ground and capacitor-coupled to the grid of cathode follower 120. Connected across the cathodes of cathode followers 120 and 122 are a pair of Zener diodes 124 connected cathode-to-cathode to provide an overloading circuit. The breakdown potential of the diode 124 is appropriately chosen to limit the potential applied to a meter 126, to protect the latter against overloading. The meter 126 has its terminals connected through a double-pole double-throw switch 128, one set of contacts of which are returned to ground, and the other set of contacts of which are respectively connected to the cathode of cathode follower 122, and, via an adjustable limiting resistor network 130, to the cathode of cathode follower 120.

The cathode of cathode follower 112 is also connected to two terminals 132 and 134 of a switch 136, the pole of which is connected through a relatively large resistor 138 to another switch pole 140. Two switch contacts 142 and 144 for the switch 140 are connected to the junction of resistors 116 and 117. In the position shown in FIG. 3 the resistor 138 is connected across the resistors 114 and 116, and, being relatively large, provides negligible loading on the meter circuit.

A second resistor-switch arrangement includes an adjustable resistor 146, of the same resistance as resistor 138, which may be switched by poles 148 and 150 to contacts 132 and 144, respectively, when the resistor 138 is switched by poles 136 and 140 to another set of contacts 152 and 154, respectively. In the upper switch position, the resistor 146 is similarly connected across the resistors 114 and 116. In the lower position of the switch, the switch poles 148 and 150 are connected to the contacts 156 and 158, respectively, to complete a voltage divider network with resistors 160 and 162. In the upper position of the switch, the poles 136 and 140 place the resistor 138 in that voltage divider network.

The adjustable tap on the resistor 146 is connected to the grid of one tube 164 of a difference amplifier. The second tube 166 of the difference amplifier receives its grid input via a selector switch 168 connected to the grid of a cathode follower 170, and via adjustable resistors 172 and 174 between the cathode follower 170 and tube 166. The cathode of tube 166 is connected through a gain-control selector switch 176 to the cathode of tube 164 directly or via gain-setting resistors 178. The output of the difference amplifier is taken at the anode of the tube 164 and coupled via a resistor-capacitor coupling to the grid of cathode follower 180, the cathode of which is connected to contacts 2 through 6 of another selector switch 182, the pole of which is connected to an intensity modulation circuit 184. A suitable form of intensity modulation circuit is described in the copending application, "Signal Converting Circuit," Ser. No. 54,988, filed September 9, 1960. The output of the circuit 184 drives the grid 68 of the display tube 42 to vary the intensity of the light spot.

Position–1 of the selector switches 168 and 182 (which are ganged) is used for set-up purposes; switch 168 is connected to ground, and switch 182 is connected to potentiometer 186 for manual adjustment of the light spot intensity. Positions–2 through –5 of selector switch 168 receive electrical signals corresponding to four different X-ray channels of the system of FIG. 1 (in which only two X-ray channels are shown for simplicity of illustration). These signals are supplied to the contacts of switch 168 via other portions of the display and selection and control 38 (FIG. 1). Position–6 of switch 68 receives the specimen-current signal derived with switch 36 in the broken-line position of FIG. 1, or the reflected current signal derived with the switch 36 shown in the full-line position of FIG. 1.

In operation, the difference amplifier 110 is used to compare the voltage output of the photomultiplier 88 with the reference voltage established by the setting of potentiometer 113. The output of the difference amplifier 110 is supplied to the cathode followers 120, 122 for driving the meter 126 when the latter is connected in circuit via current-limiting resistor 130 and the switch 128 in position–2. The reference voltage provided by the potentiometer 113 is near ground potential and provides a zero adjustment for the meter 126. That is, the potentiometer 113 provides a maximum voltage level for referencing the photomultiplier anode 100, which voltage level corresponds to a zero setting of the meter 126 and to a minimum light output level of the cathode ray tube, that is, effectively a zero light output for the recording process. As the light received by the photomultiplier 88 increases from the zero meter-setting level, the current output likewise increases, and the voltage at the photomultiplier anode decreases, as does the anode voltage of the difference amplifier 110. The cathode followers 112 and 120 provide suitable coupling circuits to drive the meter 126 from the zero position. The setting of the resistor 130 provides an appropriate full scale deflection for the meter 126, and thereby appropriate calibration of that meter.

The operation of the meter circuit 72 is the same with the resistor 146 connected out of the circuit (as shown in FIG. 3) or connected in the circuit (instead of resistor 138) via the contacts 132 and 144 since the values of resistors 138 and 146 are the same. The resistor 146 provides a light intensity signal input to the feedback circuit, and when that resistor is connected in the switch position shown in FIG. 3, the feedback circuit is out of operation. With the selector switches 168 and 182 in position–1, the intensity drive of the tube grid 68 is solely under the control of the setting of the potentiometer 186. The meter circuit 72 is operated at this time for set-up purposes to measure the desired range of the display tube light output.

Another mode of operation is provided with the selector switch 168 in any of positions–2 through –6 and the resistor 146 connected to the photometer circuit 70 via switches 148 and 150 to the contacts 132 and 144, respectively. The light intensity signal developed by the photometer circuit 70 is supplied to the tube 164 of the difference amplifier. The setting of the tap on resistor 146 determines the direct voltage level of the light intensity signal consistent with the other feedback circuit adjustments. An image information signal is supplied to the input 166 of the difference amplifier (via cathode follower 170). If the display tube output corresponds in intensity to the drive represented by the specimen signal supplied through switch 168, then the light output is at the correct value to represent the information to be recorded. Consequently, the voltage at the anode of tube 164 remains unchanged, as does the signal supplied via the feedback loop of cathode follower 180 and the selector switch 182 to the intensity modulating circuit 184. Accordingly, the display tube output remains the same.

If, however, the information signal to be recorded calls for a greater light output than that existing on the face of the display tube, the signal value supplied via the cathode follower 170 changes in a negative direction, and the anode voltage of tube 164 likewise changes negatively. A feedback signal is supplied via the intensity modulating circuit 184 to increase the drive on the grid 68, and thereby increase the display tube light output. This increase in light output correspondingly results in a more negative photometer output which reduces the grid voltage of the tube 164 to balance the input to tube 166. Thereby, a new equilibrium point is achieved in the feedback loop corresponding to a different information signal level and representative light output level. When the light signal to the tube 164 corresponds to the information signal to the tube 166, the error signal is reduced to zero. The intensity modulation signal is then maintained at a level corresponding to the information signal. In a similar manner, an opposite change in the information signal produces a reduction in the light intensity. Thus, the light intensity varies accurately with the information signal, notwithstanding drift variations in the characteristics of the display tube 42.

With the switches 148 and 150 in the lower position (as shown in FIG. 3), the feedback circuit is disconnected. The setting of the resistor 146 provides an intermediate reference value of the light level of the display tube 42. The selector switches 168 and 182 may be placed in any of positions–2 through –6 for the desired information signal to be displayed. The gain settings 174 and 176 are chosen to establish the proper signal levels to be fed to the intensity modulation circuit consistent with the light levels to be produced for the range of information signals to be displayed. The circuit operates without the feedback control as preamplifier for the modulation circuit 184. This mode of operation is useful for higher scanning speeds in which the display tube 42 is used for visual display.

The adjustment 172 is an operational control that permits a variation in gain without upsetting the direct voltage levels. This adjustment 172 is set for the tap to be at ground potential for an input signal corresponding to zero light intensity; thereby, both ends of the resistor 174 are set at ground for this input. In the feedback mode of operation the gain setting of the tap on resistor 174 controls the light excursion in accordance with the range of information signals; the latter setting together with the gain setting of switch 176 determines the overall gain for the range of information signals. The gain selector switch 176 provides a broad range of gain for the difference amplifier 164, 166 for the different modes of operation.

The feedback loop operation is at such speed as to keep pace with the information variations throughout the scanning speed. Thereby, the available speed of scanning is not limited in any way by the feedback mode of operation. The recording operation and monitoring by means of the meter circuit take place concurrently without interference of one by the other.

With extremely slow recording speed in which a raster may be scanned over the period of several hours or even a day, the beam is moving slowly as well as is the light spot on the cathode ray tube. For photographing such an extremely slow-moving light spot, proper photographic exposure requires critical adjustment of the light intensity in the near extinction region of the light spot. The meter circuit makes such adjustments possible during set-up of the system, with the camera in position and the photomultiplier axially adjacent to the camera in a proper monitoring position. A small deviation of the photomultiplier from the axis of about five to twenty-five degrees has been found to provide suitably accurate measurement of the light entering the camera. For more accurate monitoring of the exposure light, a semi-reflecting mirror may be positioned along the axis of the tube 74 to reflect a part of the exposure light to the photomultiplier. Suitable gain adjustments in the photometer circuitry ensure that the photometer signals are properly related to the exposure light intensity.

The feedback loop insures that the light level adjustment of the cathode ray tube remains uniform over the long photographic recording periods. At the same time the meter 126 may be monitored by an operator to provide readings during the entire period of the scanning. These readings are based on an average light level of the cathode ray tube within the time constant of the meter and the associated metering circuit. Thereby, the operator can follow the meter 126 to be sure that the proper range of light output is maintained by the cathode ray tube without disturbing the photographic recording.

Thus, this invention provides an improved microanalyzer system in which accurate photographic recording using a light display device is insured. A common photometer circuit is used for metering during visual display or recording as well as for a feedback loop control during recording. A camera mount is provided with a photometer monitor circuit.

What is claimed is:

1. An electron microanalyzer comprising means for directing a beam of charged particles to a specimen and for deflecting the beam in a pattern over a surface of the specimen and for deriving electrical signals characteristic of emissions from the specimen produced by the beam, a light display device having means for producing a moving light spot over a pattern synchronously with the deflection of the beam, means for deriving electrical signals characteristic of the moving light spot intensity, and means for comparing the light intensity signals with the specimen signals and for controlling the intensity of the light spot in accordance with the difference between the light intensity and the specimen signals, whereby an accurate display of the specimen signals is obtained.

2. An electron microanalyzer as recited in claim 1 and further comprising a metering circuit connected to receive said light intensity signals to provide meter indications concurrently with the operation of said comparing and intensity controlling means.

3. An electron microanalyzer as recited in claim 2 and further comprising means for selectively connecting said light intensity signal deriving means to said comparing means to operate said light display device alternatively for visual or photographic recording.

4. An electron microanalyzer as recited in claim 3 wherein said selective connecting means includes means for supplying a constant value signal to said comparing means instead of said light intensity signals.

5. An electron microanalyzer as recited in claim 1 wherein said means for deriving characteristic specimen signals includes a plurality of devices for deriving different characteristic signals, and means for selectively connecting said devices to said comparing means.

6. An electron microanalyzer as recited in claim 1 wherein said light display device includes a cathode ray tube.

7. An electron microanalyzer as recited in claim 6 and further comprising a tubular member having means for axially mounting a camera in light tight relation to photograph the face of said cathode ray tube, said light intensity signal deriving means including a phototube, and said tubular member including means for mounting said phototube to receive light from said tube face.

8. An electron microanalyzer as recited in claim 7 wherein said tubular member includes means for mounting said phototube axially adjacent said camera mounting means.

9. An electron microanalyzer as recited in claim 8 wherein said tubular member is rigid for supporting said camera and phototube and has means for mounting it to be supported on said cathode ray tube.

10. An electron microanalyzer as recited in claim 8 wherein said tubular member has shutters for said camera and phototube mounting means.

11. An electron microanalyzer comprising means for directing a beam of charged particles to a specimen and for deflecting the beam in a pattern over a surface of the specimen and for deriving electrical signals characteristic of emissions from the specimen produced by the beam, and a light recording system including a light display device having means for producing a moving light spot over a pattern synchronously with the deflection of the beam, means for varying the intensity of said spot in accordance with said specimen signals, means for deriving electrical signals characteristic of the moving light spot intensity, means for comparing the light intensity signals with the specimen signals and for controlling the light spot intensity to make the light intensity signals follow directly the specimen signals, and a metering circuit for measuring the light intensity signals to provide average light intensity values during beam deflection and recording.

12. An electron microanalyzer as recited in claim 11 wherein said means for deriving characteristic specimen signals includes a plurality of devices for deriving X-ray and electron current signals, and means for selectively connecting said devices to said intensity varying means.

13. An electron microanalyzer as recited in claim 11 wherein said light recording system further includes a rigid tubular member having means for axially supporting a camera in light tight relation to photograph the face of said cathode ray tube, said light intensity signal deriving means including a phototube, and said tubular member including means for supporting said phototube axially adjacent said axially supporting means.

14. An electron microanalyzer comprising means for directing a beam of charged particles to a specimen and for deflecting the beam in a pattern over a surface of the specimen and for deriving electrical signals characteristic of emissions from the specimen produced by the beam, a light recording system including a light display device having means for producing a moving light spot over a pattern synchronously with the deflection of the beam, said device including means for controlling the amount of light produced at any part of said light spot pattern, means for deriving electrical signals characteristic of the amount of light produced by said light spot at each part of said pattern and means for comparing said light signals and said specimen signals for corresponding parts of said patterns to obtain signals proportional to the difference therebetween, and means for supplying said difference signals to said light spot controlling means to so control the amount of light produced that said difference signals tend to be reduced to zero and the amount of light produced is accurately representative of the specimen signals.

15. An electron microanalyzer comprising means for directing a beam of charged particles to a specimen and for deflecting the beam in a pattern over a surface of the specimen and for deriving electrical signals characteristic of emissions from the specimen produced by the beam, a light recording system including a light display device having means for producing a moving light spot over a pattern synchronously with the reffection of the beam, said device including means for controlling the amount of light produced at any part of said light spot pattern, means for positioning a camera to receive directly the light from said spot, means for deriving electical signals proportional to the amount of recording light produced by said light spot at each part of said pattern and means for comparing said light signals and said specimen signals for corresponding parts of said patterns to obtain signals proportional to the difference therebetween, and means for supplying said difference signals to said light spot controlling means to so control the amount of light produced that said difference signal tend to be reduced to zero and the amount of light produced is accurately representative of the specimen signals.

References Cited by the Examiner

UNITED STATES PATENTS

| | | | |
|---|---|---|---|
| 2,257,774 | 10/1941 | Von Ardenne | 250—49.5 X |
| 2,418,029 | 3/1947 | Hillier | 250—49.5 |
| 2,751,275 | 6/1956 | Mansberg | 346—110 |
| 2,916,621 | 12/1959 | Wittry | 250—49.5 |
| 2,984,537 | 5/1961 | Jarvis et al. | 346—110 |
| 3,041,932 | 7/1962 | Kilminster | 88—24 |
| 3,067,360 | 12/1962 | Justice et al. | 250—207 X |

OTHER REFERENCES

"Amplification of the Fluoroscopic Image," by R. J. Moon, American Journal of Roentgen and Radium Therapy, June 1948, vol. 59, pages 886 to 888.

McMullan: "An Improved Scanning Electron Microscope for Opaque Specimens," Proceedings of the Institute of Electrical Engineers, part II, vol. 100, 1953, pages 245 to 256.

"The Scanning Electron Microscopic and the Electron-Optical Examination of Surfaces," by D. McMullan, Electronic Engineering, February 1953, pages 48 to 50.

X-ray Microscopy, pages 202 to 205, 1960, Cosslett and Nixon.

RALPH G. NILSON, *Primary Examiner.*

ARTHUR GAUSS, *Examiner.*